United States Patent
Chapman

(10) Patent No.: US 10,031,501 B2
(45) Date of Patent: Jul. 24, 2018

(54) APPARATUS AND METHOD FOR DETECTING DEGRADATION IN CLIMATE CONTROL SYSTEM PERFORMANCE

(75) Inventor: Colin Chapman, Cambridge (GB)

(73) Assignee: Centrica Hive Limited, Windsor (GB)

( * ) Notice: Subject to any disclaimer, the term of this patent is extended or adjusted under 35 U.S.C. 154(b) by 861 days.

(21) Appl. No.: 13/032,231

(22) Filed: Feb. 22, 2011

(65) Prior Publication Data

US 2011/0204150 A1 Aug. 25, 2011

(30) Foreign Application Priority Data

Feb. 24, 2010 (GB) .................................. 1003091.4

(51) Int. Cl.
*G05D 23/00* (2006.01)
*G05B 19/042* (2006.01)

(52) U.S. Cl.
CPC ..... *G05B 19/0428* (2013.01); *G05B 2219/24042* (2013.01); *G05B 2219/2614* (2013.01); *Y02B 70/3241* (2013.01); *Y04S 20/227* (2013.01)

(58) Field of Classification Search
CPC ........ G05B 19/0428; G05B 2219/2614; G05B 2219/24042
USPC ...... 236/94, 51; 62/126, 127, 230; 165/11.1; 700/21, 27, 30, 31, 36, 39, 47, 57, 80, 700/108, 110
See application file for complete search history.

(56) References Cited

U.S. PATENT DOCUMENTS 4,864,972 A 9/1989 Batey et al.
5,197,666 A * 3/1993 Wedekind ................... 236/46 R
(Continued)

FOREIGN PATENT DOCUMENTS

EP 2026299 A1 2/2009
GB GB 2 408 592 A 6/2005
(Continued)

OTHER PUBLICATIONS

Shariatinasab, Reza, Bijan Rahmani, and Mohsen Akbari. Application of Wavelet Analysis in Power Systems. Intech Open Access Publisher, 2012.
(Continued)

*Primary Examiner* — Larry Furdge
(74) *Attorney, Agent, or Firm* — Tucker Ellis LLP; Michael Craig

(57) ABSTRACT

The present invention relates to the detection of degradation in climate control system performance, in particular to the detection of degradation in heating system performance or air-conditioning system performance that is an indicator of impending heating system failure or air-conditioning system failure in domestic properties. In particular, the present invention provides a method for detecting such degradation comprising: receiving climate control data indicative of a climate control system in a property (location) being turned on and turned off; receiving an energy consumption signal indicative of the energy consumption of the property; correlating the received signal with the received data to determine an energy consumption signature of the climate control system when being turned on and turned off; comparing the determined signature with previously obtained energy consumption signatures to detect differences in the determined signature that are indicative of degradation.

14 Claims, 3 Drawing Sheets

(56) References Cited

U.S. PATENT DOCUMENTS

| | | |
|---|---|---|
| 8,560,134 B1 | 10/2013 | Lee |
| 8,661,283 B2 | 2/2014 | Turicchi |
| 8,989,910 B1 | 3/2015 | Klots |
| 2003/0036820 A1 | 2/2003 | Yellepeddy et al. |
| 2004/0163396 A1* | 8/2004 | Starling et al. ............... 62/127 |
| 2008/0243687 A1* | 10/2008 | Johnson et al. ............... 705/40 |
| 2009/0125825 A1 | 5/2009 | Rye et al. |
| 2011/0025519 A1 | 2/2011 | Donaldson et al. |
| 2011/0246155 A1 | 10/2011 | Fitch et al. |
| 2011/0276527 A1 | 11/2011 | Pitcher et al. |
| 2011/0288905 A1 | 11/2011 | Mrakas |
| 2011/0313964 A1 | 12/2011 | Loureda et al. |
| 2012/0052453 A1 | 3/2012 | Besore et al. |
| 2012/0078431 A1 | 3/2012 | Weatherhead |
| 2012/0078593 A1 | 3/2012 | Kubota et al. |
| 2012/0259476 A1 | 10/2012 | Trieb et al. |
| 2012/0310416 A1 | 12/2012 | Tepper et al. |
| 2012/0323510 A1 | 12/2012 | Bell et al. |
| 2013/0060352 A1 | 3/2013 | Kouda et al. |
| 2013/0103656 A1 | 4/2013 | Loureda et al. |
| 2013/0204559 A1 | 8/2013 | Hamouz et al. |
| 2013/0257626 A1 | 10/2013 | Masli et al. |
| 2014/0214221 A1 | 7/2014 | Matthews et al. |
| 2015/0046131 A1 | 2/2015 | Fei et al. |

FOREIGN PATENT DOCUMENTS

| | | |
|---|---|---|
| JP | 2010182146 A | 8/2010 |
| WO | WO 2008036751 A2 | 3/2008 |
| WO | 2009013998 A1 | 1/2009 |
| WO | 2009109787 A1 | 9/2009 |
| WO | 2010091450 A1 | 8/2010 |
| WO | 2011052957 A2 | 5/2011 |
| WO | 2011064671 A2 | 6/2011 |
| WO | 2011131984 A2 | 10/2011 |

OTHER PUBLICATIONS

Khoshmanesh et al., Reduction of fuel consumption in an Industrial glass Melting Furnace, 2007, IEEE, pp. 1-4, DOI: 10.1108/TENCON.2007.4428958.

\* cited by examiner

APPARATUS AND METHOD FOR DETECTING DEGRADATION IN CLIMATE CONTROL SYSTEM PERFORMANCE

FIELD OF THE INVENTION

The present invention relates to the detection of degradation in climate control system performance, in particular to the detection of degradation in heating system or air-conditioning system performance that is an indicator of impending climate control system failure in domestic properties.

BACKGROUND OF THE INVENTION

Domestic boilers (furnaces) and air-conditioning systems frequently fail. It would be desirable to have automated early warning of failure or impending failure, and ideally to have this information available online.

This information could be obtained directly by measuring at the boiler, or the air-conditioning unit, or communicating with any intelligence within it. However this is often not possible or desirable, not least because of the wide variety of boilers and air-conditioning units installed.

Methods and systems for "Non-Intrusive Load Monitoring" or Analytics or Disaggregation of domestic properties are known. In such systems, domestic loads are monitored for their performance and/or energy consumption, typically using current clamps and smart meters and the like.

However, such systems have their limitations when it comes to the detection of degradation in the performance of components, as the system often has no knowledge of when the boiler, or other parts of the heating or cooling system, are active or inactive.

For example, FIG. 1 shows the differentiated minute-by-minute whole-house current consumption of a property (location). The heating system start/stop events are very difficult, if not impossible to identify.

One possible solution to identify which event is the heating system being activated or switched off is to measure the current consumption over a period of days, for example shown in FIG. 2.

FIG. 2 shows the current consumption for the property over five days. As can be seen, we can start to see a step which always occurs at the same time each day (e.g. 5.30 am), which is probably the heating turning on. However, this approach only works if the heating always turns-on at a fixed time. With modern controls, heating may start at different times, depending on how cold the house is etc. So then this simple day-by-day comparison is not a reliable method of identifying, and therefore observing, the current drawn by heating system components.

We have therefore appreciated the need for a method and apparatus for detecting degradation in the performance of a boiler or air-conditioning unit that is indicative of impending failure.

SUMMARY OF THE INVENTION

The present invention provides a method for detecting degradation in the performance of a climate control system indicative of failure in the system, comprising: receiving climate control data indicative of a climate control system in a property being turned on and turned off; receiving an energy consumption signal indicative of the energy consumption of the property; correlating the received energy consumption signal with the received climate control data to determine an energy consumption signature of the climate control system when being turned on and turned off; comparing the determined energy consumption signature with previously obtained energy consumption signatures to detect differences in the determined signature that are indicative of degradation of climate control system performance indicative of impending climate control system failure.

Since in the method signals indicative of when the climate control system is being controlled are also received, this makes detection of the climate control system energy consumption signal much easier.

In embodiments, the method further comprises reporting the degradation of the performance of the climate control system to the user. Preferably this is accessible remotely via a webpage.

In embodiments of the method, comparing to detect differences detects the absence or modification of the energy consumption signature indicative of a degradation in performance.

In further embodiments of the method, the step of correlating determines that energy consumption signature of the climate control system by determining when the climate control system is turned on or off and measuring the energy consumption signal during turn on or turn off of the climate control system.

In some embodiments, the method further comprising the step of storing the determined energy consumption signature.

In some further embodiments the method further comprises controlling the climate control system in response to signals received from one or more of a thermostat, timer or climate system controller.

The present invention also provides apparatus for detecting degradation in the performance of a climate control system indicative of failure in the climate control system, comprising: a climate control signal input for receiving a climate control system control signal indicative of a climate control system in a property being turned on and turned off; an energy consumption input for receiving an energy consumption signal indicative of an energy consumption of the property; a correlator to correlate the climate control system control signal and energy consumption signal to determine an energy consumption signature of the climate control system when turned on or turned off; a detector to detect differences in the determined energy consumption signature indicative on a degradation of climate control system performance by comparing the determined energy consumption signature with previously obtained energy consumption signatures.

Since in the apparatus signals indicative of when the climate control system is being controlled are also received, this makes detection of the climate control system energy consumption signal much easier.

In embodiments, the apparatus further comprising an output to output a warning of a degradation in the performance of the climate control system to a user. Preferably, the output is accessible remotely via a webpage.

In some embodiments of the apparatus the detector detects the absence or modification of the energy consumption signature indicative of a degradation in performance.

In embodiments, the correlator determines that energy consumption signature of the climate control system by determining when the heating system is turned on or off and measuring the energy consumption signal during turn on or turn off of the climate control system.

In further embodiments, the apparatus further comprises memory to store the determined energy consumption signatures.

In some embodiments, the apparatus further comprises a controller to control the climate control system in response to signals received from one or more of a thermostat, timer or climate controller.

In further embodiments, the apparatus is located remote of the property and receives the climate control input and energy consumption signals via a wired or wireless connection.

The present invention will now be described, by way of example only, with reference to the accompanying drawings, in which:

DETAILED DESCRIPTION OF ILLUSTRATIVE EMBODIMENTS

In brief, the present invention provides a system and method in which the apparatus also receives signals indicative of when the heating system, air conditioning unit or climate control system is being controlled. As such, this makes detection of the heating system, air conditioning unit or climate control system energy consumption signal much easier, and also recognition of when there is a degradation in the system performance. The additional knowledge of when the signals occur enables to the system to time-correlate the measurements with that energy consumption signal.

Figure 1:
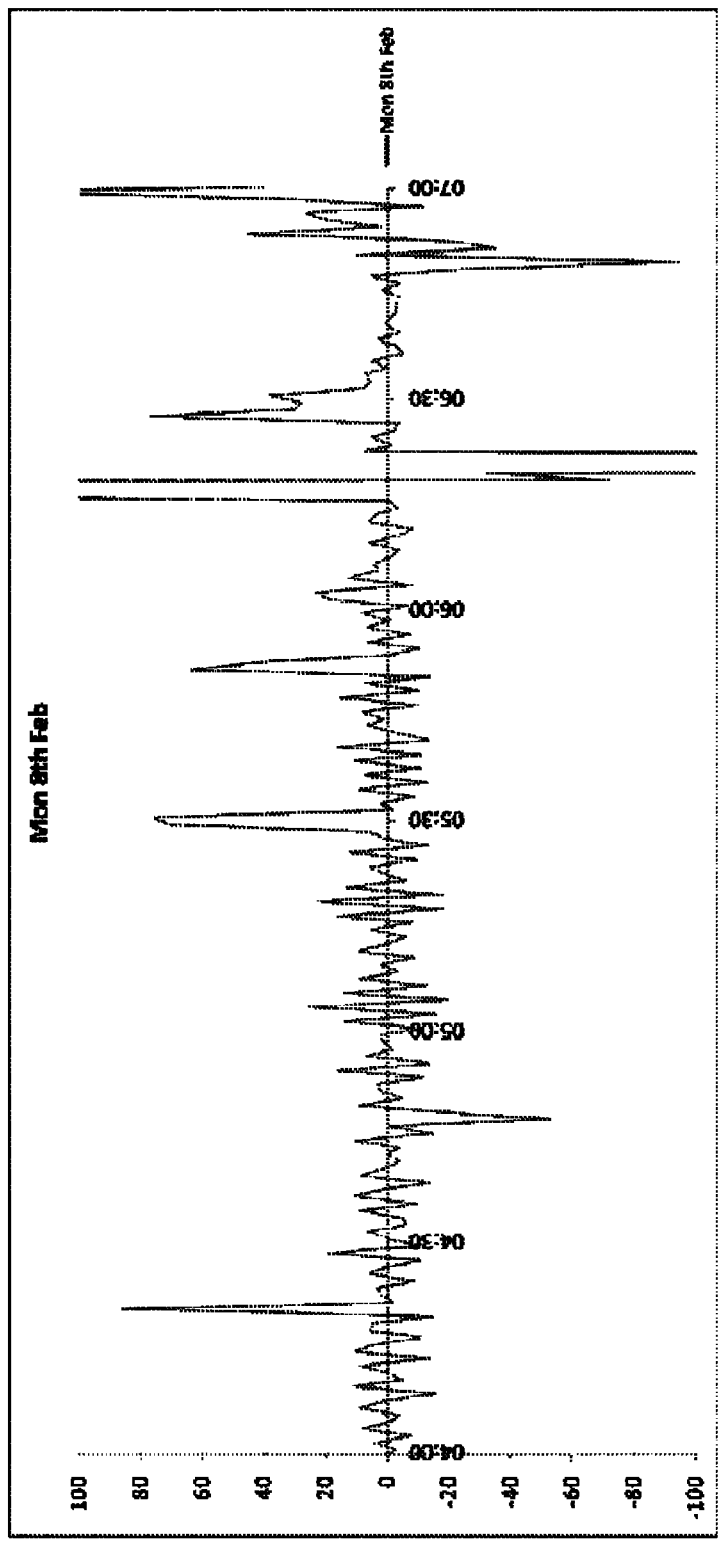
FIG. 1 shows the total current consumption for a property over the period of a day.
Figure 2:
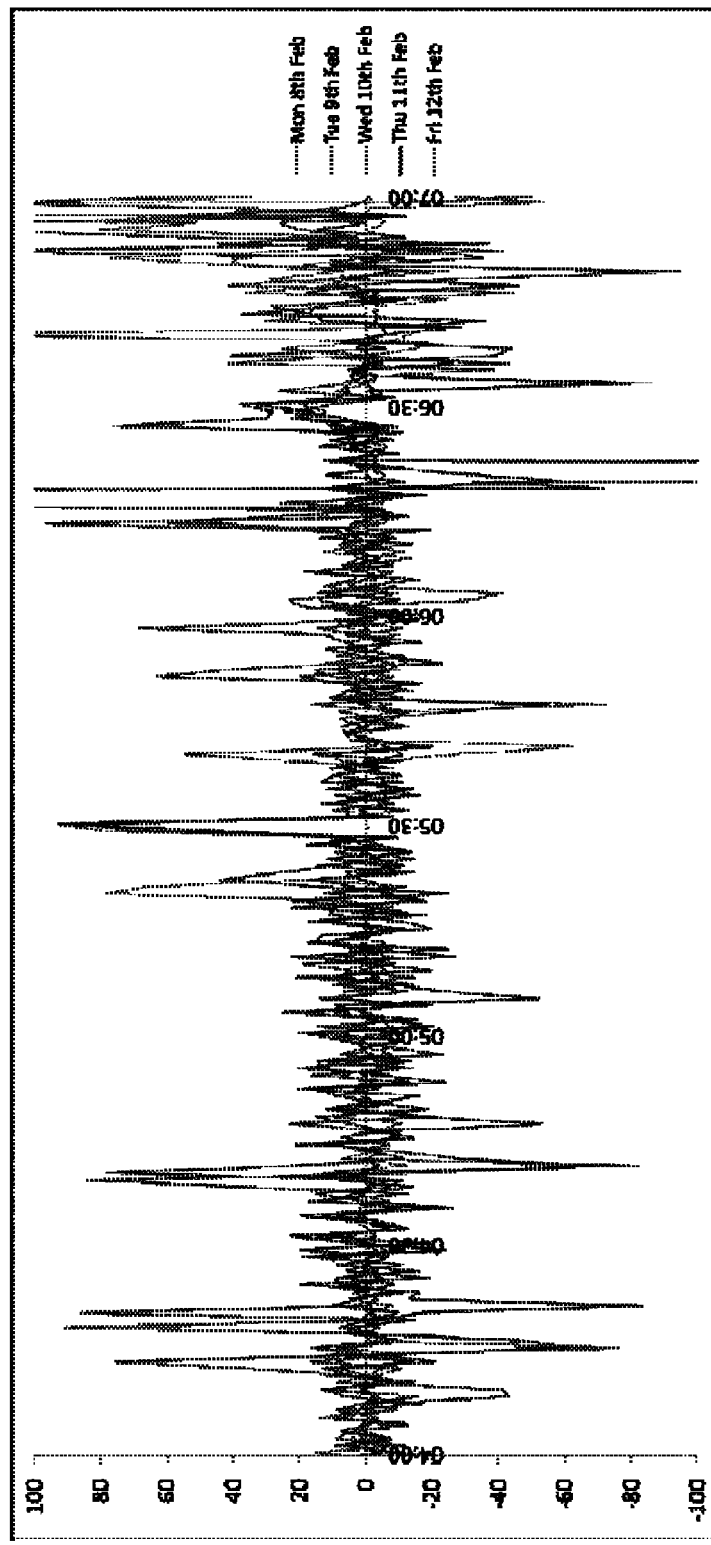
FIG. 2 shows five days of the total current consumption for a property.
Figure 3:
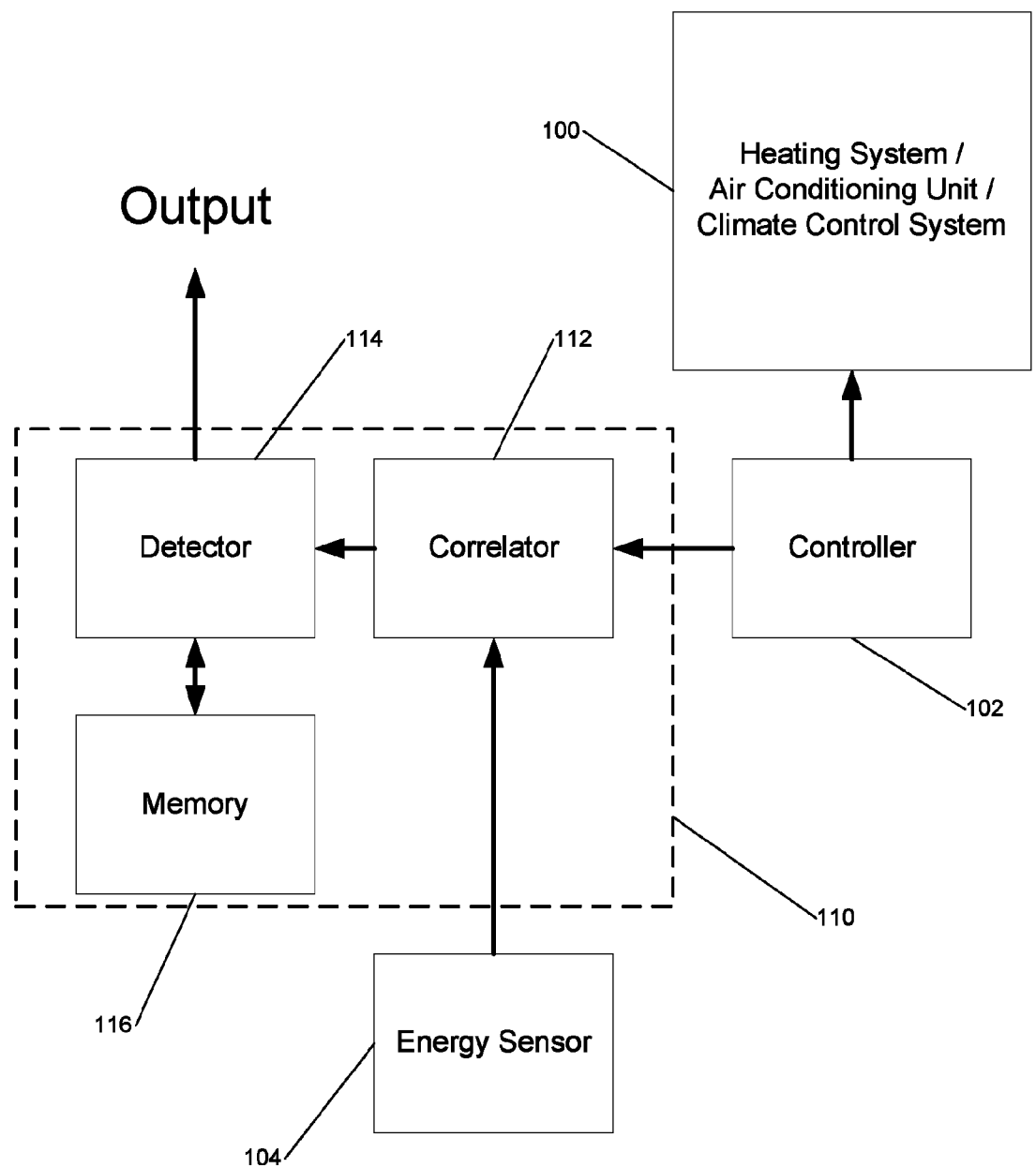
FIG. 3 shows an overview of the system according to the present invention.

FIG. 3 shows an overview of the system according to the present invention.

The heating system, air conditioning unit or climate control system 100 is controlled by the controller 102 (subsequent references to the heating system, air conditioning unit or climate control system 100 will focus on the climate control system, although it should be understood by the skilled reader that we mean any of the above). This controller may incorporate a programmable timer, a thermostat or the like. Signals from the controller are input into the apparatus for detecting the degradation in performance 110 together with signals from the energy sensor 104. Energy sensor 104 may comprise a current clamp or other smart metering devices. The energy sensor 104 provides the apparatus 110 with signals that are indicative of the energy consumption of the property of interest (a location).

From these signals, apparatus 110 time-correlates the received energy consumption signals from the energy sensor 104 with the controller signals from the controller 102, using correlator 112. As such, the apparatus 110 knows exactly when the climate control system is active and when it is not.

Typically when the climate controller request heating (or cooling), several household loads will start to consume power in response, including the boiler or air-conditioning unit itself, and the pump which circulates water. This causes a step change (or other signature) in the overall household energy consumption.

The correlated signals then enable the apparatus 110 to detect the energy consumption signature of the boiler or air conditioning unit using detector 114. By comparing the detected energy consumption signature with previously obtained energy consumption signatures (stored in memory 116), the apparatus can detect, or predict, failure in the boiler and associated heating components or air-conditioning unit and associated cooling components.

These readings may be taken over a period of several days to get a repeatable signature of what the heating system does when it turns on.

The energy consumption signature may be complex, e.g. the pump starting, then the boiler fan starting etc., and if some part of the signature disappears, or changes in level or time, it may be a more specific clue that some component in particular has gone wrong, or is going wrong, or the about way in which it is failing or requires preventative maintenance.

In embodiments of the system, the information output from the apparatus is available to the householder to indicate that failure of the climate control system is possible. This could be at the home, or available over the internet. In alternative embodiments, this information is available both to the householder and remotely to a service company.

In an alternative configuration, the climate control signal is generated internal to the apparatus 110 instead of by the controller 102. In such an embodiment, the apparatus 110 is pre-programmed with timing data relating to when the heating system will be demanded, or receives such data from the boiler, air-conditioning unit or controller.

In another embodiment, the apparatus 110 provides the controls signals to the climate control system, replacing the controller. In such an embodiment, the apparatus 110 would receive data from a timer, thermostat or other controllers in the climate control system in order to provide appropriate control signals to the climate control system when demanded.

In other alternatives, the apparatus is located remote from the property, and the signals input to the apparatus provided over a wired or wireless network, for example via the internet.

In other alternatives, the total household gas could be measured, instead of electricity consumption.

No doubt many other effective alternatives will occur to the skilled person. It will be understood that the invention is not limited to the described embodiments and encompasses modifications apparent to those skilled in the art lying within the scope of the claims appended hereto.

What is claimed is:

1. A method for detecting degradation in the performance of a climate control system indicative of failure in the climate control system, comprising:
   receiving a control signal output by a controller to control a climate control system, the control signal indicative of said climate control system in a location being turned on and turned off;
   receiving an energy consumption signal indicative of the overall energy consumption of the location, including energy consumption by a plurality of loads at the location including the climate control system;
   time-correlating the received energy consumption signal with the received climate control signal to determine an energy consumption signature of the climate control system when being turned on and turned off, wherein the time-correlating step comprises determining the energy consumption signature of the climate control system by determining, based on the climate control signal, when the climate control system is being turned on or off, and measuring the energy consumption signal during turn on or turn off of the climate control system, to produce the energy consumption signature, the energy consumption signature indicating changes in the overall energy consumption at the location during turn-on or turn-off of the climate control system; and comparing the energy consumption signature determined during turn on or turn off of the climate control system with previously measured energy consumption signatures to detect differences in the determined signature that are indicative of degradation of climate control system performance indicative of impending climate control system failure, to thereby allow maintenance to prevent failure of said climate control system;

wherein the energy consumption signature is a complex signature comprising a plurality of loads, and wherein the step of comparing the energy consumption signature with previously measured energy consumption signatures to detect differences comprises detecting disappearance of a given part of the complex signature.

2. A method according to claim 1, further comprising reporting the degradation of the performance of the climate control system to the user.

3. A method according to claim 2, wherein the reporting is accessible remotely via a webpage.

4. A method according to claim 1, wherein comparing to detect differences, detects the absence or modification of the energy consumption signature indicative of a degradation in performance.

5. A method according to claim 1, further comprising the step of storing the determined energy consumption signature.

6. A method according to claim 1, further comprising controlling the climate control system in response to signals received from one or more of a thermostat, timer, air-conditioning controller or boiler controller.

7. Apparatus for detecting degradation in the performance of a climate control system indicative of failure in the climate control system, comprising:

a climate control signal input for receiving a climate control signal output by a controller to control a climate control system in a property, the control signal indicative of the climate control system being turned on and turned off;

an energy consumption input for receiving an energy consumption signal indicative of an overall energy consumption of the property, including energy consumption by a plurality of loads at the property including the climate control system;

a correlator to time-correlate the climate control signal and energy consumption signal to determine an energy consumption signature of the climate control system when being turned on or turned off, wherein the correlator is arranged to determine the energy consumption signature of the climate control system by determining, based on the climate control signal, when the climate control system is being turned on or off, and measuring the energy consumption signal during turn on or turn off of the climate control system, to produce the energy consumption signature, the energy consumption signature indicating changes in the overall energy consumption at the property during turn-on or turn-off of the climate control system; and a detector to detect differences in the determined energy consumption signature indicative of a degradation of climate control system performance by comparing the energy consumption signature determined during turn on or turn off of the climate control system with previously measured energy consumption signatures, to thereby allow maintenance to prevent failure of said climate control system;

wherein the energy consumption signature is a complex signature comprising a plurality of loads, and wherein the detector is configured to detect differences by detecting disappearance of a given part of the complex signature.

8. Apparatus according to claim 7, further comprising an output to output a warning of a degradation in the performance of the climate control system to a user.

9. Apparatus according to claim 8, wherein the output is accessible remotely via a webpage.

10. Apparatus according to claim 7, wherein the detector detects the absence or modification of the energy consumption signature indicative of a degradation in performance.

11. Apparatus according to claim 7, further comprising memory to store the determined energy consumption signatures.

12. Apparatus according to claim 7, further comprising a controller to control the climate control system in response to signals received from one or more of a thermostat, timer, air-conditioning controller or heating system controller.

13. Apparatus according to claim 7, wherein the apparatus is located remote of the location and receives the climate control input and energy consumption signals via a wired or wireless connection.

14. A method for detecting degradation in the performance of a heating system indicative of failure in the heating system, comprising:

receiving a heating system control signal output by a controller to control a heating system in a location, the control signal indicative of the heating system being turned on and turned off;

receiving an energy consumption signal indicative of the overall energy consumption of the location, including energy consumption by a plurality of loads at the location including the heating system;

time-correlating the received energy consumption signal with the received heating system control signal to determine an energy consumption signature of the heating system when being turned on and turned off, wherein the time-correlating step comprises determining the energy consumption signature of the heating system by determining, based on the climate control signal, when the heating system is being turned on or off, and measuring the energy consumption signal during turn on or turn off of the heating system, to produce the energy consumption signature, the energy consumption signature indicating changes in the overall energy consumption at the location during turn-on or turn-off of the heating system; and comparing the energy consumption signature determined during turn on or turn off of the heating system with previously measured energy consumption signatures to detect differences in the determined signature that are indicative of degradation of heating system performance indicative of impending heating system failure, to thereby allow maintenance to prevent failure of said heating system;

wherein the energy consumption signature is a complex signature comprising a plurality of loads, and wherein the step of comparing the energy consumption signature with previously measured energy consumption signatures to detect differences comprises detecting disappearance of a given part of the complex signature.

\* \* \* \* \*